United States Patent [19]

Srogi

[11] Patent Number: 4,486,667
[45] Date of Patent: Dec. 4, 1984

[54] DRIVE SYSTEM FOR AN ELECTRIC GENERATOR

[76] Inventor: Ladislaw G. Srogi, 338 Apple St., Syracuse, N.Y. 13204

[21] Appl. No.: 314,534

[22] Filed: Oct. 26, 1981

[51] Int. Cl.³ .............................................. F16H 33/20
[52] U.S. Cl. ........................................ 290/1 R; 74/61; 310/20; 310/37; 310/81; 322/3
[58] Field of Search ..................... 310/15, 20, 23, 24, 310/36, 37, 38, 81, DIG. 1; 322/3; 290/1 R; 74/61

[56] References Cited

U.S. PATENT DOCUMENTS

| | | | |
|---|---|---|---|
| 2,054,253 | 9/1936 | Horsch | 74/61 |
| 2,266,594 | 12/1941 | Ertel | 74/61 |
| 3,161,793 | 12/1964 | Laithwaite | 290/1 R |
| 3,387,499 | 1/1971 | Bruderlein | 74/61 |

Primary Examiner—J. V. Truhe
Assistant Examiner—Shelley Wade
Attorney, Agent, or Firm—Bruns and Wall

[57] ABSTRACT

A machine for generating electrical power having a mechanical oscillator arranged to drive the armature of a linear generator. The oscillator, in turn, is driven by an independent prime mover.

7 Claims, 3 Drawing Figures

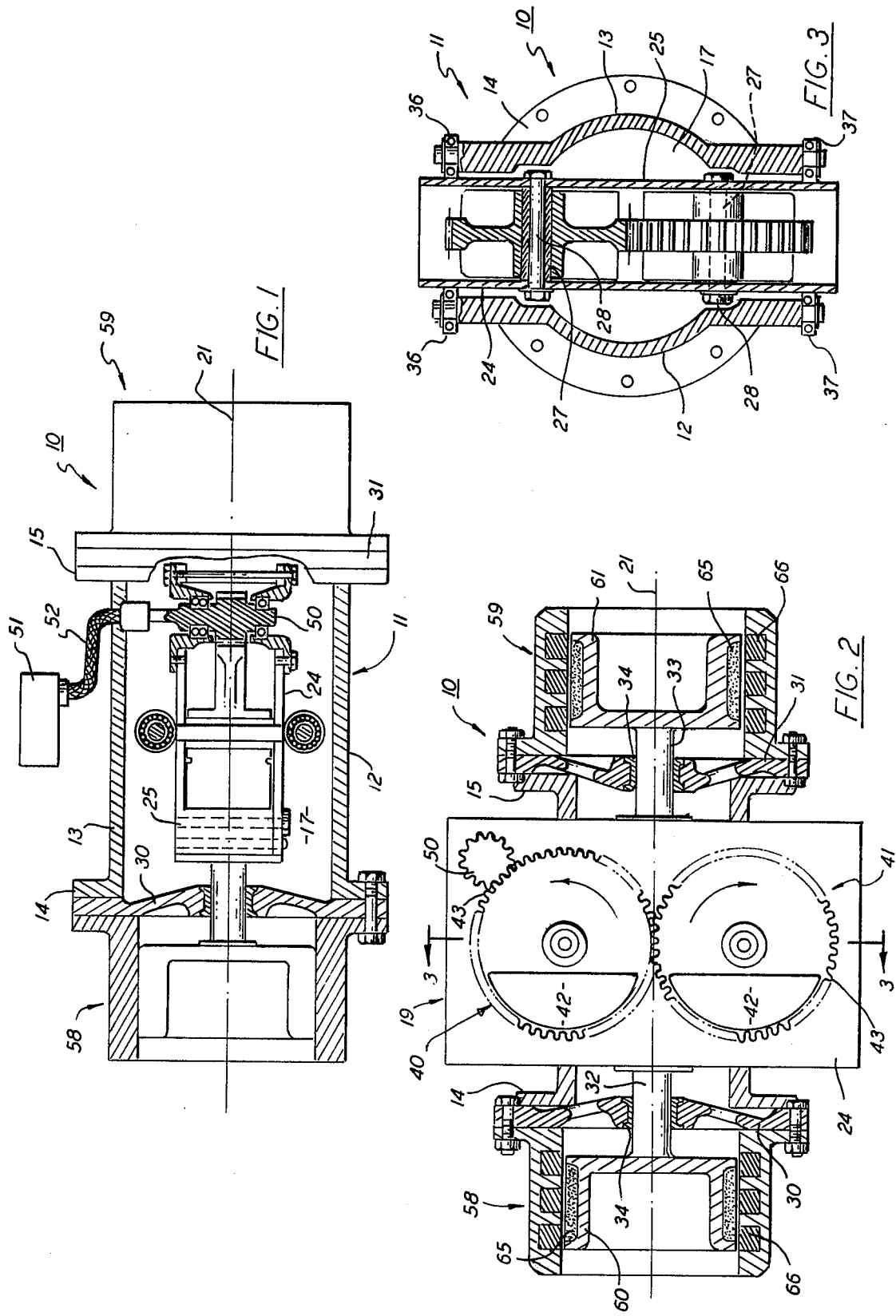

DRIVE SYSTEM FOR AN ELECTRIC GENERATOR

BACKGROUND OF THE INVENTION

This invention relates to a drive system for use in an electrical generator and, in particular, to apparatus for producing electricity by means of an armature that is driven by a mechanical vibrator system.

In U.S. Pat. No. 3,465,161 an internal combustion engine is directly coupled to an electric generator to develop electrical energy. A pair of engine cylinders are situated at opposite ends of the engine block. Free floating pistons are mounted for reciprocation within each cylinder and the pistons, in turn, are rigidly affixed to both sides of the generator field assembly. The field assembly reciprocates with the pistons inside the generator armature to generate an electrical output. An air handling system is also driven from the moving field unit which serves to move air through the engine block and thus provide the necessary cooling to the engine. As can be seen, three distinct systems are closely integrated within the unit. Any load change experienced by one system will thus adversely affect one of the other systems. By the same token, the total mass of the moving parts contained within the unit are also relatively high. Accordingly, friction and wind loss, particularly at high speeds, must be correspondingly high.

SUMMARY OF THE INVENTION

It is therefore an object of the present invention to improve electric generators.

It is a further object of the present invention to reduce friction and wind losses in electric generators.

A still further object of the present invention is to isolate the prime mover of an electric generator from the field assembly so that load changes imposed on one side of the system do not adversely affect the other side thereof.

Another object of the invention is to provide a high efficiency electric generator that employs a mechanical vibrator having a torque leveling oscillator for reciprocating the armature of the machine.

These and other objects of the present invention are attained by means of an electric generating system that includes an armature and a stator, an arm for reciprocating the armature within the stator along a linear path of travel to cut the linking magnetic lines of flux and thus generate a voltage, a mechanical vibrator coupled to the arm containing an oscillator for reciprocating the arm back and forth along a linear path of travel and a prime mover for driving the oscillating body.

BRIEF DESCRIPTION OF THE DRAWINGS

For a better understanding of these and other objects of the present invention reference is had to the following detailed description of the invention which is to be read in conjunction with the accompanying drawings, wherein:

FIG. 1 is a top plan view of an electric machine embodying the teachings of the present invention having portions broken away to more clearly illustrate the internal components of the machine;

FIG. 2 is a side elevation of the machine illustrated in FIG. 1, and

FIG. 3 is a sectional view taken along lines 3—3 in FIG. 2.

DESCRIPTION OF THE INVENTION

Referring now to the drawings wherein like numbers are used to identify like parts, there is shown a machine, generally referenced 10, that embodies the teachings of the present invention. The machine includes a main frame 11 having two opposed sidewalls 12 and 13 which are cojoined in assembly by means of a pair of annular bolting flanges 14 and 15 situated at each end of the frame. The top and bottom walls of the frame remain open to provide an elongated horizontally extended guideway 17 between the two sidewalls. A rectangular-shaped shuttle 19 is positioned within the guideway of the frame and, as will be explained in greater detail below, the shuttle is arranged to reciprocate along a linear path of travel which is defined by the axial center line 21 of the machine structure.

The shuttle is a generally lightweight structure of open construction that is capable of being driven with the expenditure of little energy along the guideway within the frame. The shuttle is formed basically of two side plates 24 and 25 which are held in spaced-apart relationship in assembly by means of a pair of spacer bearings 27—27 acting in concert with studs 28—28. The shuttle unit is slidably suspended between a pair of end walls 30 and 31 which are secured to the bolting flanges of the frame by means of shafts 32 and 33. The shafts are supported in the end walls upon linear bearings 34—34 that serve to guide the shuttle along the axis of the machine. As illustrated in FIGS. 1 and 3, a series of upper and lower roller bearings 36 and 37, respectively, are mounted in the machine frame. In assembly, the roller bearings ride in contact against the side plates of the shuttle to further assist in directing the shuttle along the desired path of travel and to reduce the amount of friction generated by the shuttle as it moves back and forth over the path of travel.

The shuttle is reciprocated by means of two rotor units generally referenced 40 and 41. The rotor units are rotatably mounted in vertical alignment within the shuttle upon the spacer bearings 27—27. Each rotor unit has a gear 43—43 formed about its outer periphery. The two identical gears are held in meshing engagement in assembly so that both rotor units turn at equal speeds about their respective axes. Each rotor unit further contains an eccentrically mounted weight 42 which is capable of generating a force-producing, unbalanced condition in the rotor structure as it rotates. The two weights, which are of equal mass, are positioned in assembly so that the vertical forces generated by the rotor units are always acting in opposition to each other. As a consequence, the vertical forces acting on the shuttle, being equal and opposite, cancel out. The weights, as shown in FIG. 2, are also positioned in assembly so that horizontal forces generated by the rotor units are always additive. As the rotor units turn through one full revolution, alternating pulses of energy are generated that act upon the shuttle to drive the shuttle back and forth along the desired horizontal path of travel.

The rotor units are driven by a drive pinion 50 which is in meshing engagement with the upper rotor unit. The drive pinion is coupled to a prime mover 51 by means of a flexible shaft 52 having sufficient mobility to accommodate the linear displacement of the shuttle. The prime mover can be any suitable drive unit capable of providing sufficient rotational power to the rotor units to set the shuttle in motion.

A pair of linear electric generators 58 and 59 are also mounted on the bolting flanges of the machine frame. Armature 60 of generator 58 is connected to shuttle shaft 32 while armature 61 of generator 59 is similarly connected to shuttle shaft 33. Each armature contains field windings 65 of the unit while the stators 62 and 63 carry the magnetic pole pieces 66. The location of the windings and pole piece can of course be reversed without departing from the teachings of the invention. Accordingly, as the shuttle is reciprocated over the defined linear path of travel, the magnetic link between the armature and stator is continually cut to produce an electrical current in a manner that is well known in the art.

As can be seen, the prime mover of the present apparatus is isolated from the electric generator units by the linear oscillator system so that the prime mover is not required to drive the armatures directly. As the rotors turn at machine speed, they have the ability to absorb energy as well as provide the motive force to drive the two generator stages. Any loading changes experienced by the generator units due to a change in the electrical load are not translated to the prime mover but are levelled off by the shuttling action of the oscillator. Accordingly, the operation of the prime mover remains relatively unaffected by fluctuations in generator loads. Changes in the power output of the generator, however, can be achieved by changing the rotational speed of the prime mover. The oscillator thus represents a self-regulating unit which serves to automatically prevent the machine from being overloaded. In the event the generator unit experiences an overload condition, the linear motion of the oscillator will slow down or may even come to a halt but the rotor units will continue to be rotated at operating speed by the prime mover. Upon removal of the overload condition, the prime mover will once again bring the oscillator back to the desired operational linear speed.

While this invention has been described with reference to the details as set forth above, it is not limited to the specific structure as disclosed and the invention is intended to cover any modifications or changes as may come within the scope of the following claims.

I claim:

1. A method of generating electrical energy that includes the steps of
   connecting the armature of an electric generator to a shuttle,
   movably mounting the shuttle for reciprocation along a linear path of travel within a stationary frame,
   securing a mechanical oscillator having unbalanced rotors to the shuttle so that alternating opposed forces developed by the rotors act upon the shuttle in the direction of said linear path of travel whereby the shuttle reciprocates along said linear path of travel, and
   driving the rotors of the oscillator from a prime mover mounted outside of the shuttle whereby the prime mover is isolated from the load demands placed upon the generator.

2. The method of claim 1 wherein the alternating opposed forces are generated by eccentrically mounting weights upon at least two rotor discs and locking the discs in a rotating relationship so that the centrifical forces generated by the weights are additive in the direction of said linear path of travel and are offsetting in a direction normal to said linear path of travel.

3. The method of claim 2 including the further step of coupling the output of the prime mover to the drive input of the rotor discs by means of a flexible connector.

4. Apparatus for producing electrical energy that includes
   a stationary frame,
   a reciprocating shuttle mounted within the frame upon a guide means for directing the shuttle back and forth along a linear path of travel,
   a mechanical oscillator affixed to the shuttle having a series of eccentrically weighted rotors that are connected to produce resultant opposing forces acting upon the shuttle along the linear path of travel as said rotors turn whereby the shuttle is reciprocally driven back and forth along said path of travel,
   at least one electrical generator that experiences varying load conditions mounted in the frame, said generator having an armature and a stator,
   means for coupling the generator to the shuttle so that the armature moves in relation to the stator as the shuttle reciprocates along said path of travel whereby the generator produces electrical energy, and
   a prime mover connected to one of the rotors for turning the rotors at a desired speed whereby the prime mover is protected from changes in the generator load by the energy absorbing characteristics of the rotors.

5. The apparatus of claim 4 whereby the prime mover is mounted outside the shuttle and is connected to one of the eccentrically weighted rotors by a flexible coupling.

6. The apparatus of claim 5 wherein the rotors are connected by meshing gears for turning each rotor at the same speed and the flexible coupling drives a pinion in meshing engagement with one of said gears.

7. The apparatus of claim 4 that includes a first electrical generator connected to one end of the shuttle and a second electrical generator connected to the other end of the shuttle whereby electrical energy is produced during each reciprocating stroke of the shuttle.

* * * * *